United States Patent
Ishibashi et al.

(10) Patent No.: US 8,767,344 B2
(45) Date of Patent: Jul. 1, 2014

(54) MAGNETIC RECORDING HEAD HAVING A NON-CONFORMAL SIDE GAP AND METHODS OF PRODUCTION THEREOF

(75) Inventors: Masayoshi Ishibashi, Tokyo (JP); Kimitoshi Eto, Kanagawa (JP); Mikito Sugiyama, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 585 days.

(21) Appl. No.: 12/976,998

(22) Filed: Dec. 22, 2010

(65) Prior Publication Data

US 2012/0162811 A1    Jun. 28, 2012

(51) Int. Cl.
*G11B 5/127* (2006.01)
(52) U.S. Cl.
USPC .................. 360/110; 360/125.13; 360/125.14
(58) Field of Classification Search
USPC ................................. 360/110, 125.13–125.14
See application file for complete search history.

(56) References Cited

U.S. PATENT DOCUMENTS

| | | | |
|---|---|---|---|
| 6,185,063 B1 | 2/2001 | Cameron | |
| 7,467,461 B2 | 12/2008 | Bonhote et al. | |
| 2006/0044682 A1 | 3/2006 | Le et al. | |
| 2007/0211377 A1* | 9/2007 | Sasaki et al. | 360/126 |
| 2007/0253107 A1* | 11/2007 | Mochizuki et al. | 360/126 |
| 2008/0273276 A1 | 11/2008 | Guan | |
| 2009/0091862 A1 | 4/2009 | Han et al. | |
| 2009/0154013 A1 | 6/2009 | Sugiyama et al. | |
| 2009/0168240 A1 | 7/2009 | Hsiao et al. | |
| 2009/0168257 A1 | 7/2009 | Hsiao et al. | |
| 2010/0061016 A1* | 3/2010 | Han et al. | 360/125.3 |

FOREIGN PATENT DOCUMENTS

| | | |
|---|---|---|
| JP | 2009-129496 | 6/2009 |
| JP | 2009-281699 | 12/2009 |

OTHER PUBLICATIONS

Bai et al., "High Density Perpendicular Recording with Wrap-Around Shielded Writer," IEEE Transactions on Magnetics, vol. 46, No. 3, Mar. 2010, p. 722-729.

* cited by examiner

*Primary Examiner* — Wayne Young
*Assistant Examiner* — Carlos E Garcia
(74) *Attorney, Agent, or Firm* — Zilka-Kotab, PC

(57) ABSTRACT

In one embodiment, a magnetic head includes a main pole having a leading side and a trailing side relative to a downtrack direction, a side gap layer positioned adjacent to the main pole in a crosstrack direction, and a side shield layer positioned adjacent the side gap layer in a crosstrack direction. The downtrack direction is in a direction of medium travel relative to the main pole, the crosstrack direction is perpendicular to the downtrack direction, the side gap layer is characterized by having a groove therein in the downtrack direction having the main pole positioned therein, the side shield is characterized by having a groove formed therein in the downtrack direction having the side gap layer positioned therein, the side gap is non-conformal in shape, and a position of the side shield relative to a position of the main pole is characterized as being self-aligned.

23 Claims, 9 Drawing Sheets

(a)

(b)

(c)

(a)

(b)

(c)

MAGNETIC RECORDING HEAD HAVING A NON-CONFORMAL SIDE GAP AND METHODS OF PRODUCTION THEREOF

FIELD OF THE INVENTION

The present invention relates to magnetic recording devices, and more particularly, to a magnetic head having a non-conformal side gap and methods of production thereof.

BACKGROUND OF THE INVENTION

Higher recording densities have been demanded for hard disk drives (HDDs) as the information society has advanced. In order to produce HDDs with increased recording density as desired, the following are requirements for magnetic recording heads have been proposed: (1) the ability to supply a sufficient magnetic field intensity for writing only, even when the main pole width is narrow; (2) a reduced erase band width; and (3) a reduced head fringe field interference with adjacent tracks (ATI).

However, satisfying all of these requirements at the same time has proved difficult in the production of conventional magnetic recording heads.

SUMMARY OF THE INVENTION

Various embodiments of the present invention are directed to a magnetic heads and methods for producing a magnetic head having a non-conformal side gap in which the side gap width is controlled to a high level of precision.

In one embodiment, a magnetic head includes a main pole having a leading side and a trailing side relative to a downtrack direction, a side gap layer positioned adjacent to the main pole in a crosstrack direction, and a side shield layer positioned adjacent the side gap layer in a crosstrack direction. The downtrack direction is in a direction of medium travel relative to the main pole, the crosstrack direction is perpendicular to the downtrack direction, the side gap layer is characterized by having a groove therein in the downtrack direction having the main pole positioned therein, the side shield is characterized by having a groove formed therein in the downtrack direction having the side gap layer positioned therein, the side gap is non-conformal in shape, and a position of the side shield relative to a position of the main pole is characterized as being self-aligned.

In another embodiment, a method for forming a magnetic head includes forming a base layer by depositing a side gap layer including a side gap material onto a substrate, forming a first groove in the side gap layer, depositing a strip including a side shield material in the first groove to form a side shield layer, and leveling a top surface of the base layer via planarizing. The method also includes forming a hard mask on the top surface of the base layer, the hard mask revealing a shape of a main pole, forming a second groove in the base layer according to at least a portion of a pattern of the hard mask, depositing the side gap material into the second groove, leveling a top surface of the side gap material in the second groove with a top surface of the hard mask via planarizing, forming a main pole groove in the side gap material in the second groove according to a portion of the pattern of the hard mask, depositing a main pole material into the main pole groove to form a main pole, and removing the hard mask. Upon completion of the magnetic head, the side gap has a non-conformal shape, and a position of the side shield relative to a position of the main pole is self-aligned.

In yet another embodiment, a magnetic head includes a main pole having a leading side and a trailing side relative to a downtrack direction, a side gap layer positioned adjacent to the main pole in a crosstrack direction, and a side shield layer positioned adjacent the side gap layer in a crosstrack direction. The downtrack direction is in a direction of medium travel relative to the main pole, the crosstrack direction is perpendicular to the downtrack direction, the side gap layer is characterized by having a groove therein in the downtrack direction having the main pole positioned therein, the side shield is characterized by having a groove formed therein in the downtrack direction having the side gap layer positioned therein, the side gap is non-conformal in shape, and a position of the side shield relative to a position of the main pole is characterized as being self-aligned, a ratio of a width to a width distribution of a portion of the side gap layer between the main pole and the side shield layer at a position coexistent with the trailing side of the main pole is about 9:1, and the main pole comprises a tapered shape having a width at the trailing side thereof that is greater than a width at the leading side thereof.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
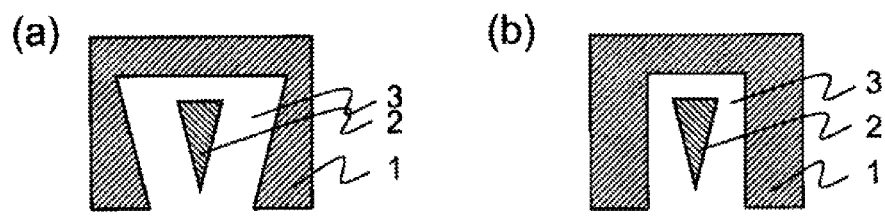
FIG. 1(a) is a schematic diagram at the air bearing surface of a conventional magnetic recording head in which the side gap width is uniform.
FIG. 1(b) is a schematic at the air bearing surface of a magnetic recording head produced in accordance with one embodiment having a non-conformal side gap wherein the width of the side gap becomes narrower on the trailing shield side.
Figure 2:
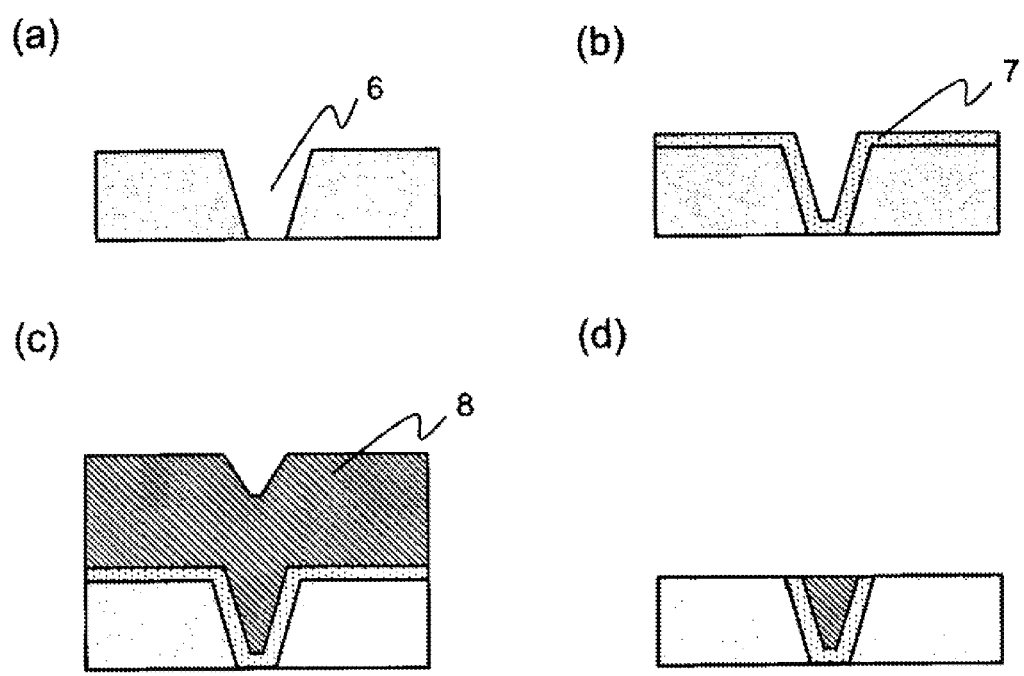
FIG. 2(a) is a process schematic that illustrates the procedure for producing a magnetic recording head having a uniform side gap width by a damascene process, schematically showing the cross section at the air bearing surface when the groove structure for producing the main pole has been produced, in one embodiment.
FIG. 2(b) is a process schematic that illustrates the procedure for producing a magnetic recording head having a uniform side gap width by a damascene process, schematically showing the cross section at the air bearing surface when the side gap layer has been laminated, in one embodiment.
FIG. 2(c) is a process schematic that illustrates the procedure for producing a magnetic recording head having a uniform side gap width by a damascene process, schematically showing the cross section at the air bearing surface when the main pole material has been implanted by plating, in one embodiment.
FIG. 2(d) is a process schematic that illustrates the procedure for producing a magnetic recording head having a uniform side gap width by a damascene process, schematically showing the cross section at the air bearing surface when the upper portion has been planarized, in one embodiment.
Figure 3:
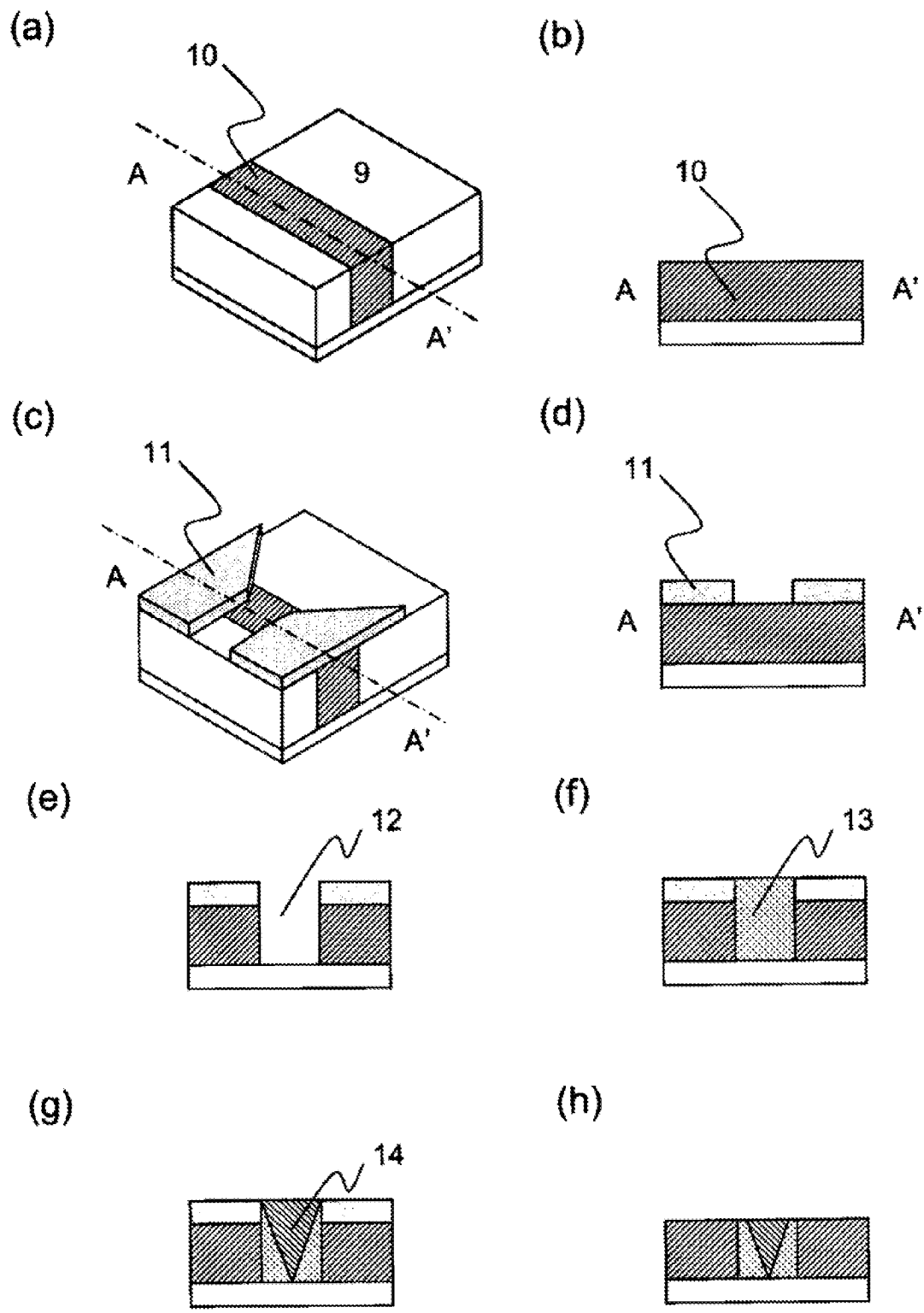
FIGS. 3(a)-3(h) are process schematics illustrating a method for producing a magnetic recording head having a non-conformal side gap, in one embodiment.
Figure 4:
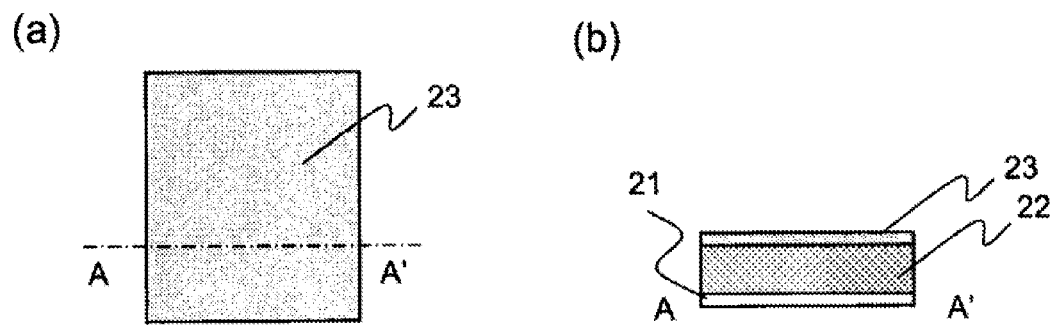
FIGS. 4(a)-4(b) are process schematics illustrating a method for producing a magnetic recording head having a non-conformal side gap, in one embodiment.
Figure 5:
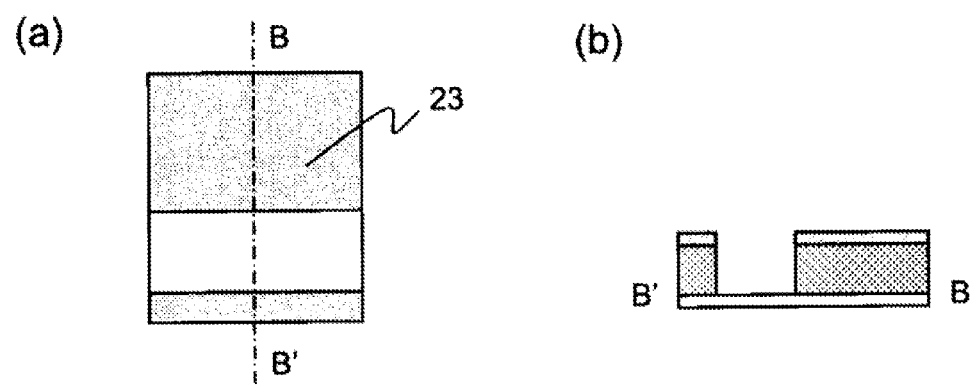
FIGS. 5(a)-5(b) are process schematics illustrating a method for producing a magnetic recording head having a non-conformal side gap, in one embodiment.
Figure 6:
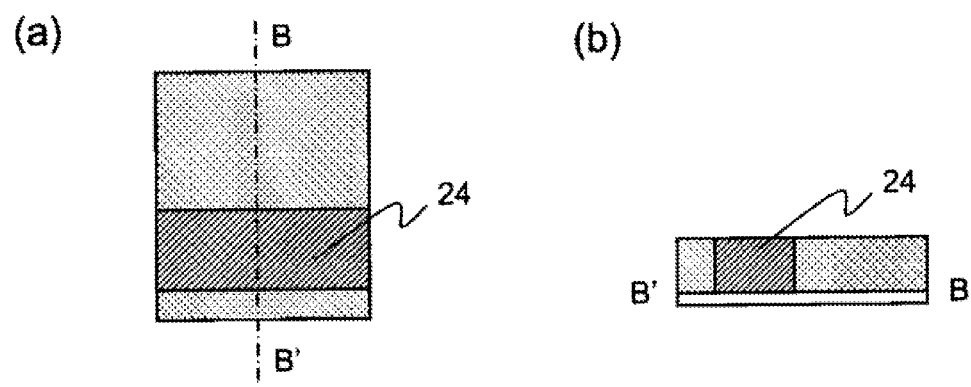
FIGS. 6(a)-6(b) are process schematics illustrating a method for producing a magnetic recording head having a non-conformal side gap, in one embodiment.
Figure 7:
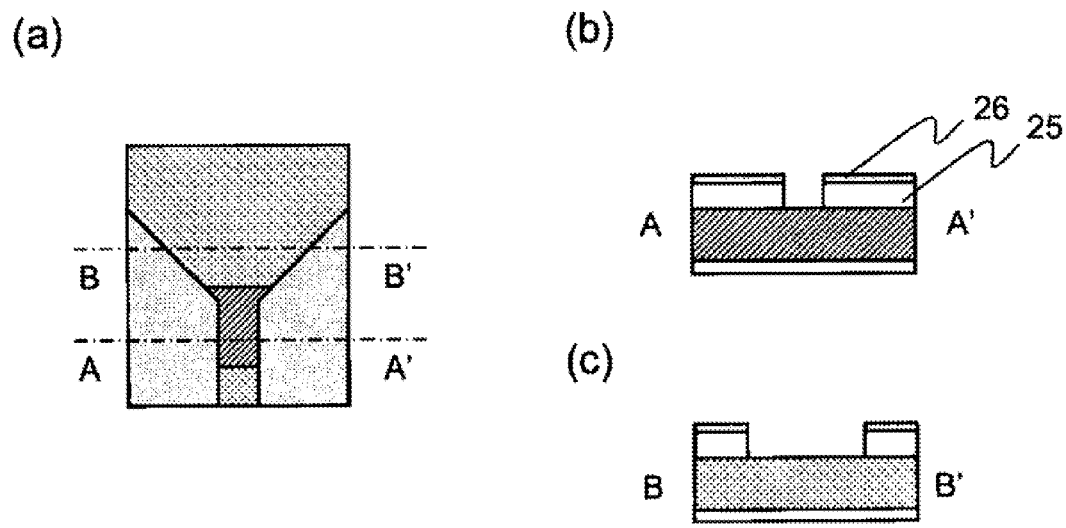
FIGS. 7(a)-7(c) are process schematics illustrating a method for producing a magnetic recording head having a non-conformal side gap, in one embodiment.
Figure 8:
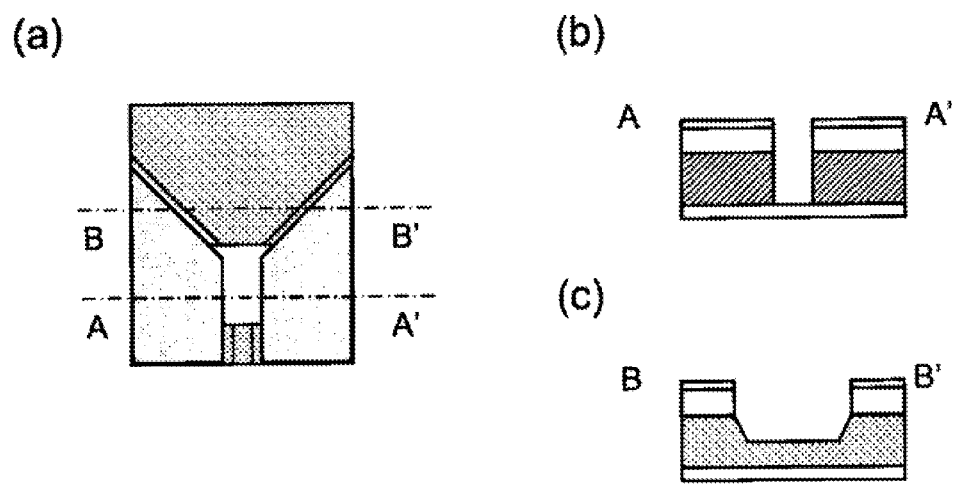
FIGS. 8(a)-8(c) are process schematics illustrating a method for producing a magnetic recording head having a non-conformal side gap, in one embodiment.
Figure 9:
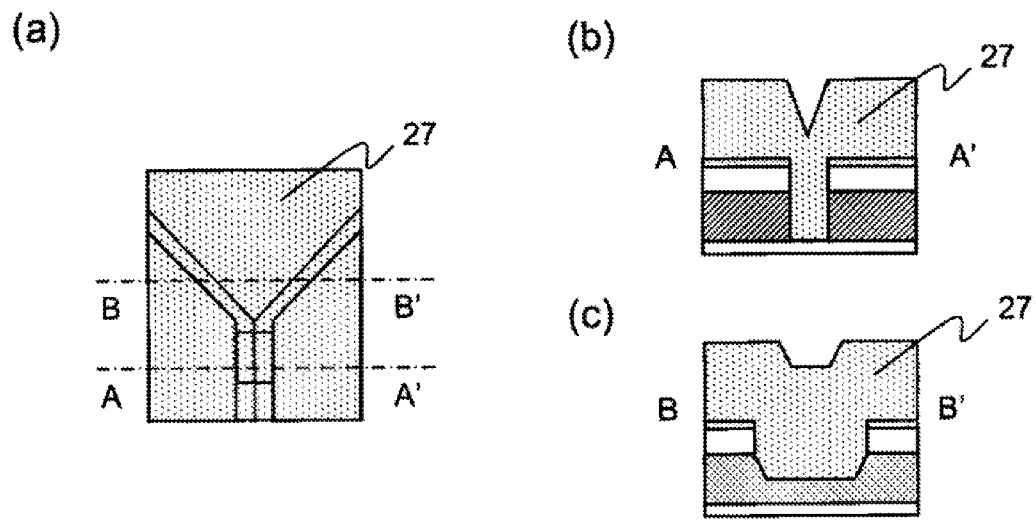
FIGS. 9(a)-9(c) are process schematics illustrating a method for producing a magnetic recording head having a non-conformal side gap, in one embodiment.
Figure 10:
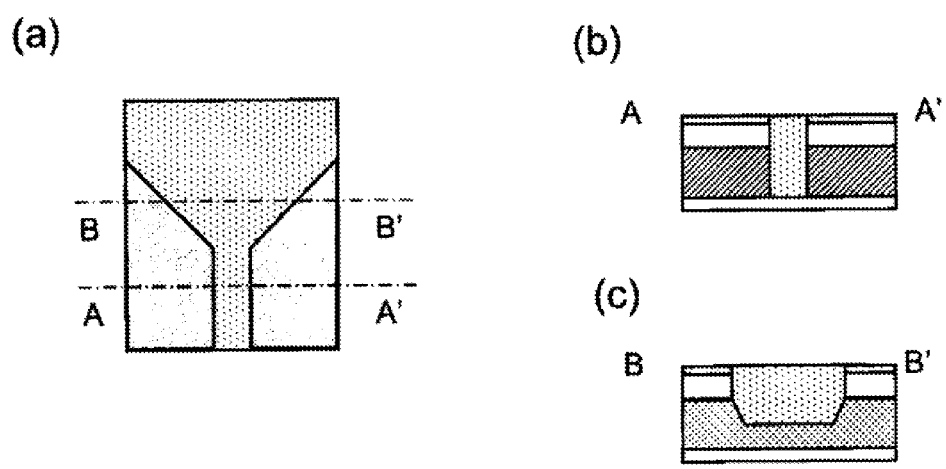
FIGS. 10(a)-10(c) are process schematics illustrating a method for producing a magnetic recording head having a non-conformal side gap, in one embodiment.
Figure 11:
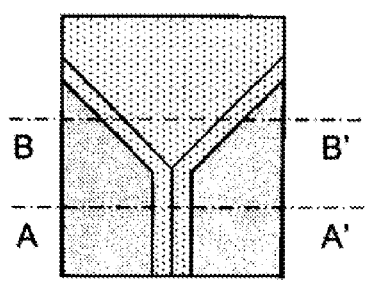
FIGS. 11(a)-11(c) are process schematics illustrating a method for producing a magnetic recording head having a non-conformal side gap, in one embodiment.
Figure 11:
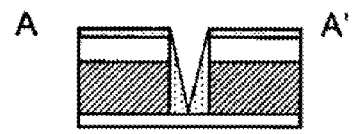
Figure 11:
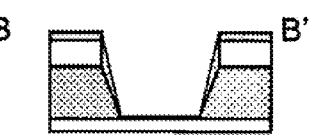
Figure 12:
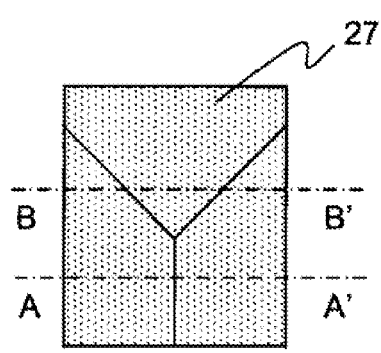
FIGS. 12(a)-12(c) are process schematics illustrating a method for producing a magnetic recording head having a non-conformal side gap, in one embodiment.
Figure 12:
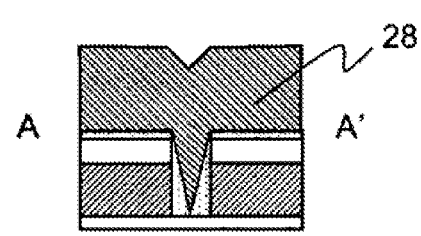
Figure 12:
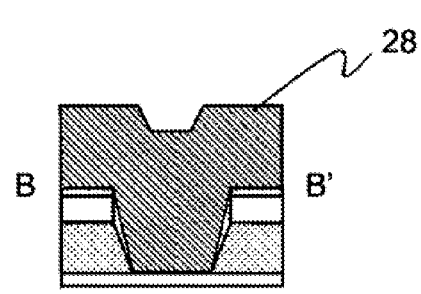
Figure 13:
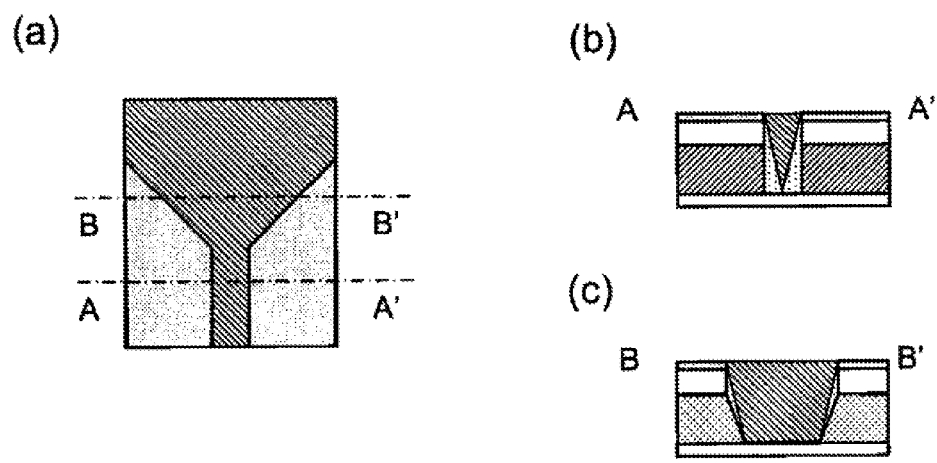
FIGS. 13(a)-13(c) are process schematics illustrating a method for producing a magnetic recording head having a non-conformal side gap, in one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a magnetic head includes a main pole having a leading side and a trailing side relative to a downtrack direction, a side gap layer positioned adjacent to the main pole in a crosstrack direction, and a side shield layer positioned adjacent the side gap layer in a crosstrack direction. The downtrack direction is in a direction of medium travel relative to the main pole, the crosstrack direction is perpendicular to the downtrack direction, the side gap layer is characterized by having a groove therein in the downtrack direction having the main pole positioned therein, the side shield is characterized by having a groove formed therein in the downtrack direction having the side gap layer positioned therein, the side gap is non-conformal in shape, and a position of the side shield relative to a position of the main pole is characterized as being self-aligned.

In another general embodiment, a method for forming a magnetic head includes forming a base layer by depositing a side gap layer including a side gap material onto a substrate, forming a first groove in the side gap layer, depositing a strip including a side shield material in the first groove to form a side shield layer, and leveling a top surface of the base layer via planarizing. The method also includes forming a hard mask on the top surface of the base layer, the hard mask revealing a shape of a main pole, forming a second groove in the base layer according to at least a portion of a pattern of the hard mask, depositing the side gap material into the second groove, leveling a top surface of the side gap material in the second groove with a top surface of the hard mask via planarizing, forming a main pole groove in the side gap material in the second groove according to a portion of the pattern of the hard mask, depositing a main pole material into the main pole groove to form a main pole, and removing the hard mask. Upon completion of the magnetic head, the side gap has a non-conformal shape, and a position of the side shield relative to a position of the main pole is self-aligned.

In yet another general embodiment, a magnetic head includes a main pole having a leading side and a trailing side relative to a downtrack direction, a side gap layer positioned adjacent to the main pole in a crosstrack direction, and a side shield layer positioned adjacent the side gap layer in a crosstrack direction. The downtrack direction is in a direction of medium travel relative to the main pole, the crosstrack direction is perpendicular to the downtrack direction, the side gap layer is characterized by having a groove therein in the downtrack direction having the main pole positioned therein, the side shield is characterized by having a groove formed therein in the downtrack direction having the side gap layer positioned therein, the side gap is non-conformal in shape, and a position of the side shield relative to a position of the main pole is characterized as being self-aligned, a ratio of a width to a width distribution of a portion of the side gap layer between the main pole and the side shield layer at a position coexistent with the trailing side of the main pole is about 9:1, and the main pole comprises a tapered shape having a width at the trailing side thereof that is greater than a width at the leading side thereof.

To address the requirements of producing magnetic heads having increased recording density, Japanese Patent Application Publication No. 2009-281699 proposes a magnetic recording head having a structure as shown in FIG. 1(b), in which the width of a side gap 3 on the trailing shield side is narrower than in the prior art, as shown in FIG. 1(a), where the width of the side gap 3 between a side shield 1 and a main pole 2 is constant, in order to reduce the erase band width while maintaining a sufficient magnetic field intensity for writing. A side gap having a width that differs on the trailing side and leading side is referred to below as a non-conformal side gap.

With recording heads having a conventional uniform side gap width, the recording heads may be produced by a method such as that described below. When the production involves a damascene process, a groove structure for producing the main pole is prepared and a side gap film is laminated on the groove structure to a desired thickness. In this process, provided that the film is formed by a process which makes it possible to provide a uniform thickness of film, such as sputter deposition or chemical vapor deposition among others, it is possible to form a side gap having a uniform width. After this, main pole material is implanted, such as via plating, and an upper portion is planarized so that it is possible to produce a main pole and a side gap film of uniform width. When a thickness of the side gap is uniform in this way, the side gap film is formed by a method which makes it possible to provide a uniform thickness of film, whereby it is possible to produce a side gap of uniform width with a good degree of accuracy.

In the case of a non-conformal side gap, however, the side gap width measured in a crosstrack direction is not constant therealong in a downtrack direction, and therefore a method of the type described above cannot be used. U.S. Patent Application Publication No. US2010/0061016A1, among others, proposes a method for producing the side gap portion of a magnetic recording head having a non-conformal side gap. In this method, the main pole is produced in a state in which it is implanted in the side gap material, after which the surface is planarized and a resist mask is produced in a specific area by lithography in order to form the side gap. The side gap is then produced by subjecting this area to milling and etching at the mask. When a side gap has been produced using a method of this kind, the accuracy of the side gap width depends on the positioning precision and resolution of the lithography apparatus, factors which are difficult to control.

The width of the side gap needs to be reliably controlled in order to raise the signal-to-noise ratio (SNR), especially in shingled magnetic recording (SMR), such as that proposed in U.S. Pat. No. 6,185,063. As an estimate in a typical model, when a 750 Gb/in$^2$ magnetic recording head is produced with a side gap on the order of about 45 nm is used, the side gap width distribution must be no greater than 5 nm in order to achieve an adequate SNR. However, the 3σ positioning accuracy in a conventional lithography apparatus employing an ArF scanner is on the order of ±15 nm, so it is difficult to achieve sufficient accuracy with a good yield.

A method for producing a main pole and shield portions of a recording head according to one embodiment is described with the aid of FIGS. 3(a)-16(d), as described below. The method of producing the magnetic head does not employ a lithography apparatus, and therefore the side gap width does not depend on the positioning accuracy of the lithography apparatus. It is therefore possible to control the side gap width with a high level of accuracy.

In one preferred embodiment, a method for forming a magnetic head includes forming a base layer by depositing a side gap layer including a side gap material onto a substrate, forming a first groove in the side gap layer, depositing a strip including a side shield material in the first groove to form a side shield, and leveling a top surface of the base layer via planarizing. The method also includes forming a hard mask on the top surface of the base layer, the hard mask revealing a shape of a main pole, forming a second groove in the base layer according to a pattern of the hard mask, depositing the side gap material into the second groove, leveling a top surface of the side gap material in the second groove with a top surface of the hard mask via planarizing, forming a main pole groove in the side gap material in the second groove according to the pattern of the hard mask, depositing a main pole material into the main pole groove to form a main pole, and removing the hard mask. Upon completion of the magnetic head, the side gap has a non-conformal shape, and a position of the side shield relative to a position of the main pole is self-aligned.

Referring to FIGS. 3(a)-3(h), in one embodiment, a main pole 14 is produced by a damascene process. In this process, a damascene first groove is formed in a side gap material layer 9 that is formed above a substrate. Into this groove, a side shield material 10 is implanted in the form of a strip at a position where the side shield will be when the head is completed, and an upper surface is planarized so that there is no difference in level with the side gap material 9, as shown in FIGS. 3(a) and 3(b). The groove may be formed to a depth coexistent with the top surface of the substrate, or even deeper, in some embodiments. A hard mask 11 in a shape which reveals a shape of the main pole is formed above the side gap layer 9 and the side shield material 10, as shown in FIGS. 3(c) and 3(d). This hard mask 11 is used to produce a second groove 12 for forming the side gap, as shown in FIG. 3(e). After this, the second groove is filled with side gap material 13 and planarized to a height coexistent with a top surface of the hard mask, as shown in FIG. 3(f). At this point the hard mask is not removed. A main pole groove in the side gap material is then formed for the main pole according to the pattern of the hard mask, and this is filled with main pole material 14 in order to produce the main pole, as shown in FIG. 3(g). In addition, the hard mask layer 11 is removed, such as via grinding it down, whereby it is possible to produce a recording head having a non-conformal side gap shape in which the positions of the side shield and the main pole relative to one another are self-aligned, as shown in FIG. 3(h).

In some approaches, the method may include forming a trailing gap above the main pole and forming a trailing shield above the trailing gap.

According to various embodiments, the side gap material may include alumina or some other suitable insulator, and/or the side shield material may include at least one of: Fe, Co, Ni, and alloys thereof such as FeCoNi, among others, and/or the hard mask may include at least one of: Ni, Cr, Ta, and alloys thereof, such as NiCr/Ta, among others.

in more embodiments, planarizing may include chemical-mechanical polishing (CMP) or any other suitable leveling method as would be known in the art.

According to more approaches, forming grooves may include one of: ion milling, reactive ion etching, and/or damascene processing, among others. In a preferred embodiment, forming the second groove includes using a process which removes the side shield material more quickly than the side gap material, thereby forming a non-conformal side gap shape.

In more approaches, any of the depositing of the side gap layer, the strip, the side gap material in the second groove, and the main pole may include laminating, lithography and plating, implanting, etc.

Also, in some approaches, removing any layer, such as the hard mask, may include one of: grinding, ion milling, reactive ion etching, planarizing, and/or chemical-mechanical polishing, among others.

FIGS. 4(a)-4(b) schematically show a situation where the side gap material for producing the groove for forming the main pole has been laminated on a reproduction head isolation film. FIG. 4(a) is a schematic view seen from above the substrate, and FIG. 4(b) is a view in cross section along line A-A' at the position of the air bearing surface. A side gap layer 22 comprising the side gap material and a chemical mechanical planarization (CMP) stopper layer 23 are formed on the reproduction head isolation film 21. In this exemplary embodiment, alumina may be used for the side gap layer 22 and diamond-like carbon (DLC) may be used for the CMP stopper layer 23. Of course, any suitable materials as would be apparent to one of skill in the art may be used.

The CMP stopper layer 23 and the side gap layer 22 are then removed in a strip shape at the position where the side shield is to be produced. That, is to say, a resist pattern may be produced on the CMP stopper layer 23 via lithography employing a silicon-containing resist, after which the CMP stopper layer 23 is removed in a strip shape via reactive ion etching (RIE) employing oxygen gas, and the side gap layer 22 is then removed in a strip shape via RIE employing $CF_4$ gas. After this the resist pattern is peeled off, the structure may look like that shown in FIGS. 5(a)-5(b). FIG. 5(a) is a schematic view seen from above the substrate, and FIG. 5(b) is a view in cross section along line B-B'.

After a side shield material film has been formed, it may then be planarized. In one embodiment, FeCoNi which may be the side shield material, is formed as a sputtered film to produce a side shield layer 24 after which it is planarized by CMP. After this, the CMP stopper layer 23 is removed, such as via RIE employing oxygen gas.

FIGS. 6(a)-6(b) schematically show the structure after the stopper layer has been removed, according to one embodiment. FIG. 6(a) is a schematic diagram seen from above the substrate, and FIG. 6(b) is a view in cross section along line B-B'. Here, after the side gap layer 22 has been produced, the side shield layer 24 is produced by implantation thereof, but it is equally possible for the opposite to be the case, and for the side shield layer to be produced by lithography and plating processes, and then for the side gap layer 22 to be formed and planarized, in various embodiments.

A hard mask for producing a damascene groove is produced next, in one embodiment. That is to say, a hard mask layer 25 which constitutes the hard mask material and a CMP stopper layer 26 may then be laminated. In this exemplary embodiment, NiCr/Ta may be used for the hard mask layer and DLC may be used for the CMP stopper layer, in some approaches. A resist pattern is formed on the CMP stopper layer 26 by lithography, after which the CMP stopper layer 26 and the hard mask layer 25 are removed, such as via RIE employing oxygen gas and ion milling.

FIGS. 7(a)-7(c) show the structure after removing the CMP stopper layer 26 and the hard mask layer 25, according to one embodiment. FIG. 7(a) is a schematic diagram seen from above the substrate, FIG. 7(b) is a view in cross section along line A-A' at the position of the air bearing surface, and FIG. 7(c) is a view in cross section along line B-B' at the flared portion. The side shield layer 24 may then be perpendicularly etched, such as via RIE employing methanol or ion milling, with the hard mask comprising the CMP stopper layer 26 and the hard mask layer 25 acting as a mask.

FIGS. 8(a)-8(c) show the structure after etching, in one approach. FIG. 8(a) is a schematic diagram seen from above the substrate, FIG. 8(b) is a view in cross section along line A-A' at the position of the air bearing surface, and FIG. 8(c) is a view in cross section along line B-B' at the flared portion. In the RIE employing methanol or ion milling, the magnetic material forming the side shield layer (FeCoNi alloy in the case of this exemplary embodiment) may be removed more quickly than the side gap layer (alumina in the case of this exemplary embodiment), and therefore the cross-sectional shape after etching may be non-conformal, such as that shown in FIGS. 8(b)-8(c).

A film of side gap material may then be formed in order to fill a groove which was produced, such as via a preprocessing step. In this exemplary embodiment, the same alumina as in the side gap layer 22 may be used for a back-fill side gap layer 27. Of course, any material may be used as would be apparent to one of skill in the art upon reading the present descriptions. FIGS. 9(a)-9(c) show the structure after the side gap material has been formed, according to one embodiment. FIG. 9(a) is a schematic diagram seen from above the substrate, FIG. 9(b) is a view in cross section along line A-A' at the position of the air bearing surface, and FIG. 9(c) is a view in cross section along line B-B' at the flared portion. The back-fill side gap layer 27 is then planarized, such as via CMP, until the CMP stopper layer 26 is exposed.

FIGS. 10(a)-10(c) show the result of these operations, in one approach. FIG. 10(a) is a schematic diagram seen from above the substrate, FIG. 10(b) is a view in cross section along line A-A' at the position of the air bearing surface, and FIG. 10(c) is a view in cross section along line B-B' at the flared portion. The side gap layer may then be etched, such as via RIE, so that a beveled angle is formed, with the hard mask comprising the CMP stopper layer 26 exposed at the surface and the hard mask layer 25 being used as a mask. RIE is carried out in this exemplary embodiment, but the shape can equally be produced by ion milling or some other technique.

FIGS. 11(a)-11(c) show the structure after etching, in one embodiment. FIG. 11(a) is a schematic diagram seen from above the substrate, FIG. 11(b) is a view in cross section along line A-A' at the position of the air bearing surface, and FIG. 11(c) is a view in cross section along line B-B' at the flared portion. The back-fill side gap layer 27 and the side gap layer 22 may be formed from the same alumina, in one approach, and therefore they may be etched to the same depth in the cross sections A-A' and B-B'. Of course, any materials may be used as would be apparent to one of skill in the art upon reading the present descriptions. Therefore, after the etching has been carried out, the back-fill side gap layer 27 is exposed at the surface in the cross section A-A' and the back-fill side gap layer 27 and the side gap layer 22 are exposed at the surface in the cross section B-B'. However, the back-fill side gap layer 27 and the side gap layer 22 are formed in different steps, and therefore a boundary is formed at the surface of the side gap layer 22 where the back-fill side gap layer 27 is laminated.

A seed film for plating the main pole may then be formed on the substrate surface, the main pole material may be plated, and the main pole 28 may be produced, in one approach. In this exemplary embodiment, CoFeNi is used for the main pole material, but any material may be used as known in the art. FIGS. 12(a)-12(c) show this structure schematically. FIG. 12(a) is a schematic diagram seen from above the substrate, FIG. 12(b) is a view in cross section along line A-A' at the position of the air bearing surface, and FIG. 12(c) is a view in cross section along line B-B' at the flared portion. The main pole 28 may then be leveled or planarized, such as via CMP, until the CMP stopper layer 26 is exposed.

FIGS. 13(a)-13(c) show this structure schematically. FIG. 13(a) is a schematic diagram seen from above the substrate, FIG. 13(b) is a view in cross section along line A-A' at the position of the air bearing surface, and FIG. 13(c) is a view in cross section along line B-B' at the flared portion. The surface may then be etched, such as via ion milling, so that the side gap has a desired width. In this process, when the surface of the main pole opposite the trailing shield is formed with a tapered structure, referred to below as a trailing edge taper (TET), in order to increase the strength of the magnetic field produced by the main pole, a resist may be patterned on the flared portion, after which the TET may be formed, such as via ion milling.

FIGS. 14(a)-14(d) show this structure schematically. FIG. 14(a) is a schematic diagram seen from above the substrate, FIG. 14(b) is a view in cross section along line A-A' at the position of the air bearing surface, FIG. 14(c) is a view in cross section along line B-B' at the flared portion, and FIG.

Figure 14:
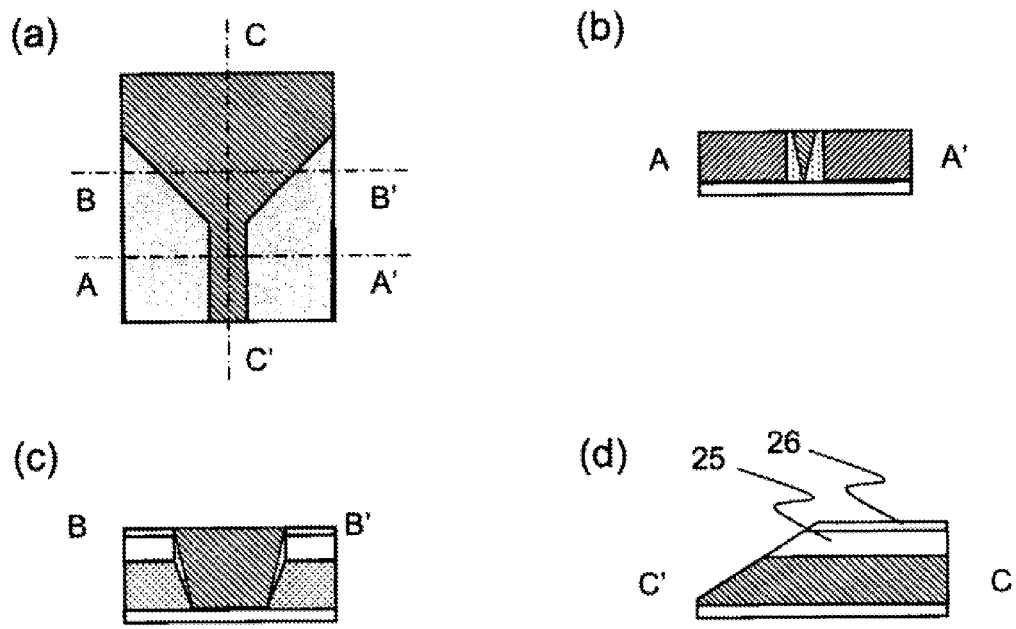
FIGS. 14(a)-14(d) are process schematics illustrating a method for producing a magnetic recording head having a non-conformal side gap, in one embodiment.

14(*d*) is a view in cross section along line C-C' which is the cross section in the center of the main pole in the direction perpendicular to line A-A'. As shown in FIG. 14(*d*), the hard mask layer is not removed, but instead may be used as a separator for the main pole and the trailing shield. If a TET is not used, the resist pattern is not applied, and the whole surface is etched back, in one approach.

Figure 15:
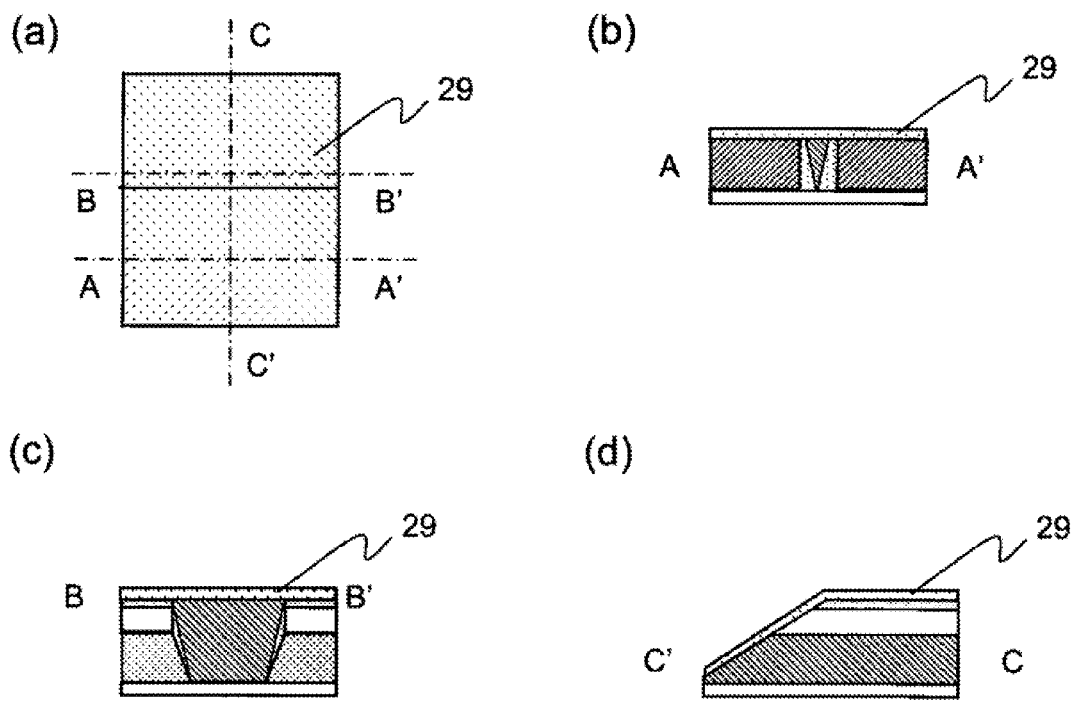
FIGS. 15(a)-15(d) are process schematics illustrating a method for producing a magnetic recording head having a non-conformal side gap, in one embodiment.

In addition, a trailing gap material which comprises a trailing gap 29 may be formed. In this exemplary embodiment, alumina may be used for the trailing gap material, but of course, any material may be used as would be apparent to one of skill in the art upon reading the present descriptions. FIGS. 15(*a*)-15(*d*) show this structure schematically. FIG. 15(*a*) is a schematic seen from above the substrate, FIG. 15(*b*) is a view in cross section along line A-A' at the position of the air bearing surface, FIG. 15(*c*) is a view in cross section along line B-B' at the flared portion, and FIG. 15(*d*) is a view in cross section along line C-C' which is the cross section in the center of the main pole in the direction perpendicular to line A-A'.

A resist pattern may then be formed, such as via lithography, and the trailing gap 29 may be shaped, such as via ion milling, in one embodiment, after which a seed film may be formed in order to produce the trailing shield, such as via plating. Lithography may be used to form a resist pattern, in one embodiment, and the trailing shield material may be implanted within the resist pattern, such as via plating, among other methods. After this, the resist may be peeled off, and the seed film may be removed, such as via ion milling, among other methods, in order to produce the trailing shield.

Figure 16:
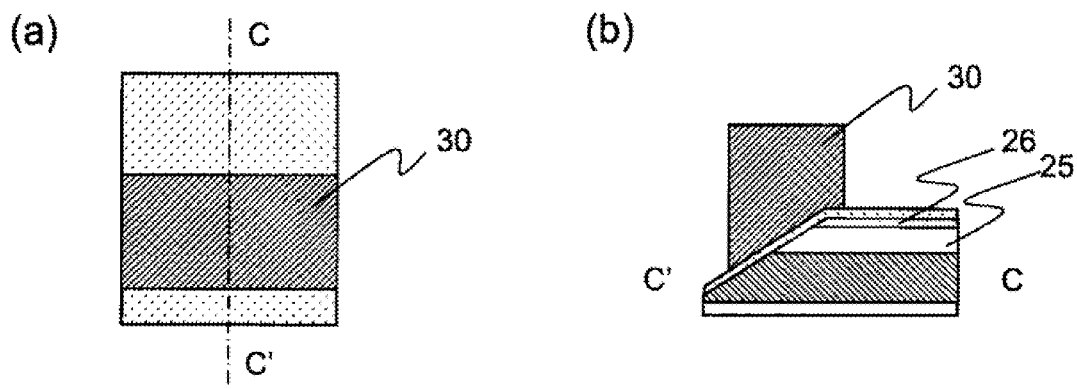
FIGS. 16(a)-16(b) are process schematics illustrating a method for producing a magnetic recording head having a non-conformal side gap, in one embodiment.

FIGS. 16(*a*)-16(*b*) show the structure schematically after the operations described above. FIG. 16(*a*) is a schematic diagram seen from above the substrate, and FIG. 16(*b*) is a view in cross section along line C-C' of FIG. 16(*a*). As is clear from FIGS. 16(*a*)-16(*b*), the hard mask layer 25 or the hard mask layer 25 and the CMP stopper layer 26 is/are not removed but instead may be used as a separator for the main pole and the trailing shield 30, in one approach. The gap between the trailing shield and the main pole on the flared side is therefore wider, and the trailing shield absorbs less of the magnetic field produced by the main pole on the flared side, so it is possible to effectively produce a magnetic field at the air bearing surface, in some approaches.

It is thus possible to produce a main pole having a nonconformal side gap, in preferred embodiments. When the methods and embodiments described above are used with a main pole structure wherein the track width is about 45 nm and the bevel angle is about 10°, it is possible to produce a main pole having a non-conformal side gap wherein the side gap width on the trailing shield side is about 45 nm and the distribution is about 5 nm. Of course, other dimensions may be used also, which may correspond to other track widths, main pole widths, magnetic head sizes, etc., as would be apparent to one of skill in the art upon reading the present descriptions.

Furthermore, using embodiments described herein, it is also possible to produce a recording head having a nonconformal side gap with a main pole structure in which the leading side is tapered and/or a structure in which there is a shield on the leading side, by employing a substrate in which the leading side is tapered and/or a substrate in which there is a shield on the leading side.

In one embodiment, a magnetic head includes a main pole having a leading side and a trailing side relative to a downtrack direction, a side gap positioned adjacent to the main pole in a crosstrack direction, and a side shield positioned adjacent the side gap in a crosstrack direction. The downtrack direction is in a direction of medium travel relative to the main pole and the crosstrack direction is perpendicular to the downtrack direction. The side gap is characterized by having a groove encompassing the side shield formed therein in the downtrack direction, the side shield is characterized by having a groove encompassing the main pole formed therein in the downtrack direction, the side gap is non-conformal in shape, and a position of the side shield relative to a position of the main pole is characterized as being self-aligned.

According to one embodiment, the magnetic head may include a trailing gap formed adjacent the main pole in the downtrack direction and a trailing shield formed above the trailing gap in the downtrack direction. The trailing gap and the trailing shield may comprise the same materials as the side gap and the side shield, or different materials, as would be known to one of skill in the art.

In one approach, the side gap may have a width at a position coexistent with the trailing side of the main pole of about 45 nm, and the side gap may have a width distribution at a position coexistent with the trailing side of the main pole of about 5 nm. Of course, other dimensions may be used which correspond to different main pole widths, track widths, etc.

According to another approach, the side shield may include at least one of: Fe, Co, Ni, and alloys thereof, among others. In yet another approach, the main pole may include at least one of: Fe, Co, Ni, and alloys thereof, among others.

In one embodiment, the main pole may include a tapered structure having a width at the trailing side thereof that is greater than a width at the leading side thereof. In this or any other embodiment, the side gap may include a structure having a beveled angle of about 10°. Of course, other angles may be used as would be apparent to one of skill upon reading the present descriptions.

Figure 17:
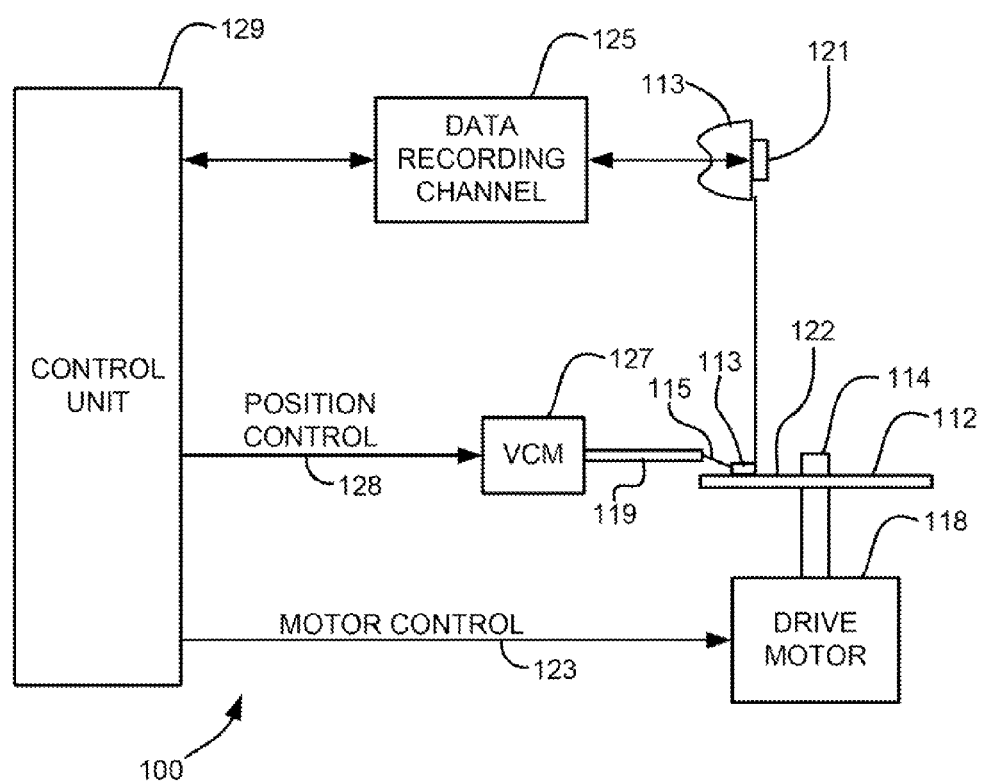
FIG. 17 is a schematic diagram of a magnetic recording system, according to one embodiment.

Referring now to FIG. 17, there is shown a disk drive 100 in accordance with one embodiment of the present invention. As shown in FIG. 17, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 17 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 17 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In one preferred embodiment, as shown in FIG. 17, a system 100 may include a magnetic recording medium 112, at least one magnetic head 121 according to any embodiment herein for reading from and/or writing to the magnetic recording medium 112, a magnetic head slider 113 for supporting the at least one magnetic head 121, and a control unit 129 coupled to the at least one magnetic head 121 for controlling operation of the at least one magnetic head 121.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head, comprising:
a main pole having a leading side and a trailing side relative to a downtrack direction, wherein the downtrack direction is in a direction of medium travel relative to the main pole;
a side gap layer positioned adjacent to the main pole in a crosstrack direction, wherein the crosstrack direction is perpendicular to the downtrack direction, and wherein the side gap layer is positioned on both sides of a flared portion of the main pole in the crosstrack direction, the flared portion of the main pole being positioned away from an air bearing surface of the main pole in an element height direction; and
a side shield layer positioned adjacent the side gap layer in a crosstrack direction,
wherein the side gap layer is characterized as having a first groove therein in the crosstrack direction, the side shield layer being positioned in the first groove,
wherein the side gap layer is characterized by having a main pole groove therein in the downtrack direction, the main pole being positioned in the main pole groove,
wherein the side shield layer is characterized by having a second groove therein in the downtrack direction, the side gap layer being positioned in the second groove,
wherein the side gap layer is non-conformal in shape, and
wherein a position of the side shield layer relative to a position of the main pole is characterized as being self-aligned due to positioning of the main pole groove within the second groove at an intersection thereof with the first groove.

2. The magnetic head as recited in claim 1, further comprising:
a trailing gap adjacent the main pole in the downtrack direction; and
a trailing shield above the trailing gap in the downtrack direction.

3. The magnetic head as recited in claim 1, wherein a portion of the side gap layer between the main pole and the side shield layer has a width at a position coexistent with the trailing side of the main pole of about 45 nm, and wherein the side gap layer has a width distribution at a position coexistent with the trailing side of the main pole of about 5 nm.

4. The magnetic head as recited in claim 1, wherein an end of the main pole at an air bearing surface thereof has a triangular shape.

5. The magnetic head as recited in claim 1, wherein the main pole has a tapered shape having a width at the trailing side thereof that is greater than a width at the leading side thereof.

6. The magnetic head as recited in claim 1, wherein portions of the side gap layer each have a tapered shape having a width at the leading side thereof that is greater than a width at a trailing side thereof.

7. A system, comprising:
a magnetic recording medium;
at least one magnetic head as recited in claim 1 for reading from and/or writing to the magnetic recording medium;
a magnetic head slider for supporting the at least one magnetic head; and
a control unit coupled to the at least one magnetic head for controlling operation of the at least one magnetic head.

8. The magnetic head as recited in claim 1, wherein the side gap layer has a width at an air bearing surface thereof that is greater than a width of the side gap layer at a position away from the air bearing surface in the element height direction.

9. The magnetic head as recited in claim 1, wherein the side gap layer positioned on both sides of the flared portion of the main pole is non-conformal in shape, and wherein the flared portion of the main pole has a width at the trailing side thereof that is greater than a width at the leading side thereof.

10. A method for forming the magnetic head as recited in claim 1, the method comprising:
forming a base layer, comprising:
depositing the side gap layer comprising a side gap material onto a substrate;
forming the first groove in the side gap layer;
depositing a strip comprising a side shield material in the first groove to form the side shield layer; and
leveling a top surface of the base layer via planarizing;
forming a hard mask on the top surface of the base layer, the hard mask revealing a shape of the main pole;
forming the second groove in the base layer according to at least a portion of a pattern of the hard mask;
depositing the side gap material into the second groove;
leveling a top surface of the side gap material in the second groove with a top surface of the hard mask via planarizing;
forming the main pole groove in the side gap material in the second groove according to a portion of the pattern of the hard mask;
depositing a main pole material into the main pole groove to form the main pole; and
removing the hard mask.

11. The method as recited in claim 10, further comprising:
forming a trailing gap above the main pole; and
forming a trailing shield above the trailing gap.

12. The method as recited in claim 10, wherein the side gap material comprises alumina.

13. The method as recited in claim 10, wherein the planarizing comprises chemical-mechanical polishing.

14. The method as recited in claim 10, wherein the forming the first groove comprises a process selected from a group consisting of: ion milling, reactive ion etching, and damascene processing.

15. The method as recited in claim 10, wherein the forming the second groove comprises a process selected from a group consisting of: ion milling, reactive ion etching, and damascene processing.

16. The method as recited in claim 15, wherein the forming the second groove comprises a process which removes the side shield material more quickly than the side gap material, thereby forming a non-conformal side gap shape.

17. The method as recited in claim 10, wherein the forming the main pole groove comprises a process selected from a group consisting of: ion milling, reactive ion etching, and a damascene process.

18. The method as recited in claim 10, wherein depositing comprises laminating for any of the side gap layer, the strip, the side gap material in the second groove, and the main pole.

19. The method as recited in claim 10, wherein depositing comprises lithography and plating for any of the side gap layer, the strip, the side gap material in the second groove, and the main pole.

20. The method as recited in claim 10, wherein depositing comprises implanting for any of the side gap layer, the strip, the side gap material in the second groove, and the main pole.

21. The method as recited in claim 10, wherein the removing the hard mask comprises a process selected from a group consisting of: grinding, ion milling, reactive ion etching, planarizing, and chemical-mechanical polishing.

22. A magnetic head, comprising:
a main pole having a leading side and a trailing side relative to a downtrack direction, wherein the downtrack direction is in a direction of medium travel relative to the main pole;
a side gap layer positioned adjacent to the main pole in a crosstrack direction, wherein the crosstrack direction is perpendicular to the downtrack direction; and
a side shield layer positioned adjacent the side gap layer in a crosstrack direction,
wherein the side gap layer is characterized as having a first groove therein in the crosstrack direction, the side shield layer being positioned in the first groove,
wherein the side gap layer is characterized by having a main pole groove therein in the downtrack direction, the main pole being positioned in the main pole groove,
wherein the side shield layer is characterized by having a second groove therein in the downtrack direction, the side gap layer being positioned in the second groove,
wherein the side gap layer is non-conformal in shape,
wherein a position of the side shield layer relative to a position of the main pole is characterized as being self-aligned due to positioning of the main pole groove within the second groove at an intersection thereof with the first groove, and wherein a ratio of a width to a width distribution of a portion of the side gap layer between the main pole and the side shield layer at a position coexistent with the trailing side of the main pole is about 9:1.

23. A magnetic head, comprising:
a main pole having a leading side and a trailing side relative to a downtrack direction, wherein the downtrack direction is in a direction of medium travel relative to the main pole;
a side gap layer positioned adjacent to the main pole in a crosstrack direction, wherein the crosstrack direction is perpendicular to the downtrack direction; and
a side shield layer positioned adjacent the side gap layer in a crosstrack direction,
wherein the side gap layer is characterized by having a groove therein in the downtrack direction, the main pole being positioned in the groove,
wherein the side shield layer is characterized by having a groove therein in the downtrack direction, the side gap layer being positioned in the groove,
wherein the side gap layer is non-conformal in shape,
wherein a position of the side shield layer relative to a position of the main pole is characterized as being self-aligned,
wherein a ratio of a width to a width distribution of a portion of the side gap layer between the main pole and the side shield layer at a position coexistent with the trailing side of the main pole is about 9:1, and
wherein the main pole comprises a triangular shape having a width at the trailing side thereof that is greater than a width at the leading side thereof.

* * * * *